（12） United States Patent
Jin et al.

(10) Patent No.: US 12,197,877 B2
(45) Date of Patent: Jan. 14, 2025

(54) VISUAL LANGUAGE PROCESSING MODELING FRAMEWORK VIA AN ATTENTION-ON-ATTENTION MECHANISM

(71) Applicant: VIRGINIA TECH INTELLECTUAL PROPERTIES, INC., Blacksburg, VA (US)

(72) Inventors: Ran Jin, Blacksburg, VA (US); Xiaoyu Chen, Louisville, KY (US)

(73) Assignee: VIRGINIA TECH INTELLECTUAL PROPERTIES, INC., Blacksburg, VA (US)

( * ) Notice: Subject to any disclaimer, the term of this patent is extended or adjusted under 35 U.S.C. 154(b) by 0 days.

(21) Appl. No.: 18/051,998

(22) Filed: Nov. 2, 2022

(65) Prior Publication Data
US 2023/0289535 A1  Sep. 14, 2023

Related U.S. Application Data

(60) Provisional application No. 63/275,071, filed on Nov. 3, 2021.

(51) Int. Cl.
G06F 40/40 (2020.01)
G06F 3/01 (2006.01)
(Continued)

(52) U.S. Cl.
CPC .............. G06F 40/40 (2020.01); G06F 3/013 (2013.01); G06T 7/20 (2013.01); G06T 7/70 (2017.01);
(Continued)

(58) Field of Classification Search
CPC . G06F 40/40; G06F 3/013; G06T 7/20; G06T 7/70; G06T 2207/20084;
(Continued)

(56) References Cited

U.S. PATENT DOCUMENTS

| 8,758,018 B2* | 6/2014 | Peot ...................... G09B 19/06 434/167 |
| 2006/0008123 A1* | 1/2006 | Sweeney ................ G09B 17/00 382/114 |

(Continued)

OTHER PUBLICATIONS

Chen, Xiaoyu; Zeng, Yingyan; Kang, Sungku; Jin, Ran, "INN: An Interpretable Neural Network for AI Incubation in Manufacturing," ACM Transactions on Intelligent Systems and Technology, vol. 13, No. 5, Article 85, Jun. 2022, pp. 1-23.

(Continued)

*Primary Examiner* — Sahlu Okebato
(74) *Attorney, Agent, or Firm* — Perilla Knox & Hildebrandt LLP; Jonathan A. Paulis

(57) ABSTRACT

Disclosed are various embodiments for a visual language processing modeling framework via an attention-on-attention mechanism, which may be employed for object identification, classification, and the like. In association with a display of a user interface, an eye tracking via images captured by an imaging device is performed to programmatically detect eye movement and fixation relative to sub-regions of the user interface. Eye fixations on at least one of the sub-regions from the eye tracking. Visual cues are extracted from the user interface based at least in part on the eye fixations, the visual cues being in a sequence of identification. A visual language sentence is generated based at least in part on the visual cues as extracted. The visual language sentence of the visual cues in the sequence of identification is correlated to at least one decision using a visual language understanding routine.

20 Claims, 10 Drawing Sheets

(51) Int. Cl.
  *G06T 7/20*    (2017.01)
  *G06T 7/70*    (2017.01)
  *G06V 10/82*   (2022.01)
  *G06V 40/19*   (2022.01)

(52) U.S. Cl.
  CPC .............. *G06V 10/82* (2022.01); *G06V 40/19* (2022.01); *G06T 2207/20084* (2013.01); *G06T 2207/30201* (2013.01)

(58) Field of Classification Search
  CPC .......... G06T 2207/30201; G06V 10/82; G06V 40/19; G06V 10/764
  See application file for complete search history.

(56) References Cited

U.S. PATENT DOCUMENTS

| | | | | |
|---|---|---|---|---|
| 2012/0269441 | A1* | 10/2012 | Marchesotti | G06F 18/253 382/195 |
| 2014/0092006 | A1* | 4/2014 | Boelter | G09G 5/363 345/156 |
| 2014/0289834 | A1* | 9/2014 | Lindemann | G06Q 20/425 726/7 |
| 2015/0338915 | A1* | 11/2015 | Publicover | G06F 3/0304 345/633 |

OTHER PUBLICATIONS

Chen, Xiaoyu; Jin, Ran, "Statistical Modeling for Visualization Evaluation through Data Fusion," Applied Ergonomics, vol. 65, pp. 551-561, Jan. 2017.

Chen, Xiaoyu; Lau, Nathan; Jin, Ran, "PRIME: A Personalized Recommender System for Information Visualization Methods via Extended Matrix Completion," ACM Transactions on Interactive Intelligent Systems, vol. 11, No. 1, Article 7, Mar. 2021, pp. 1-30.

Burch, Michael, "Mining and Visualizing Eye Movement Data," Proceedings of SA '17 Symposium on Visualization, Bangkok, Thailand, Nov. 27-30, 2017, pp. 1-8.

Dosovitskiy, Alexey; Beyer, Lucas; Kolesnikov, Alexander; Weissenborn, Dirk; Zhai, Xiaohua; Unterthiner, Thomas; Dehghani, Mostafa; Minderer, Matthias; Heigold, Georg; Gelly, Sylvain; Uszkoreit, Jakob; Houlsby, Neil, "An Image is Worth 16×16 Words: Transformers for Image Recognition at Scale," Proceedings of the International Conference on Learning Representations (ICLR 2021), May 2021, pp. 1-15.

Frischen, Alexandra; Bayliss, Andrew P.; Tipper, Steven P., "Gaze Cueing of Attention: Visual Attention, Social Cognition, and Individual Differences," Psychological Bulletin, vol. 133, No. 4, Jul. 2007, pp. 694-724.

Huang, Wenyan; Chen, Xiaoyu; Jin, Ran; Lau, Nathan, "Detecting Cognitive Hacking in Visual Inspection with Physiological Measurements," Applied Ergonomics, vol. 84, Apr. 2020, Article 103022.

Liversedge, Simon P.; Findlay, John M., "Saccadic Eye Movements and Cognition," Trends in Cognitive Sciences, vol. 4, No. 1, Jan. 2000, pp. 6-14.

Vaswani, Ashish; Shazeer, Noam; Parmar, Niki; Uszkoreit, Jakob; Jones, Llion; Gomez, Aidan N.; Kaiser, Łukasz; Polosuhkin, Illia, "Attention Is All You Need," 31st Conference on Neural Information Processing Systems (NIPS 2017), Long Beach, CA, USA, Nov. 2017, pp. 1-15.

* cited by examiner

VISUAL LANGUAGE PROCESSING MODELING FRAMEWORK VIA AN ATTENTION-ON-ATTENTION MECHANISM

CROSS-REFERENCE TO RELATED APPLICATION

This application claims the benefit of and priority to U.S. Provisional Patent Application No. 63/275,071 entitled "A VISUAL LANGUAGE PROCESSING MODELING FRAMEWORK VIA AN ATTENTION-ON-ATTENTION MECHANISM, filed Nov. 3, 2021, the contents of which being incorporated by reference in their entirety herein.

BACKGROUND

Human expertise plays an important role in incubating artificial intelligence (AI) in manufacturing systems, where AI is employed to enhance process modeling, monitoring, and control. Meaningful features from raw data are typically generated as a numerical representation of human expertise to support better AI modeling performance. For example, human visual searching patterns can imply informative features in manufacturing inspection, which will augment image processing methods to generate more significant features for the supervised learning-based AI inspection tasks. Hence, quantitatively understanding human visual searching process will not only advance knowledge preservation of human expertise, but also enhance the AI modeling performance by imitating the human visual searching process.

BRIEF SUMMARY

A general visual language processing (VLP) modeling framework is proposed to provide computational-attention-on-visual-attention (AonA) based on eye movements. Specifically, the VLP modeling framework generates a visual sentence based at least in part on a transition of fixations, where the fixations are extracted from eye movements that represent visual attention. Then, the VLP modeling framework correlates the visual sentence with a visual searching decision (e.g., defect classification in a manufacturing inspection task) by identifying a most significant word in the visual sentence (e.g., computational attention). This VLP modeling framework explains visual searching decisions via AonA even for counter-intuitive scenarios when cognitive threats bias human decision making. Experimental results indicate that VLP modeling framework enhances data-driven feature generation methods by providing additional AonA features.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIG. 1A is a nonconforming product with high surface roughness, and FIG. 1B is a conforming product with satisfactory surface roughness.

FIG. 7B represents AonA under the presence of priming with biased decision, and FIG. 7C is the AonA under the presence of priming with unbiased decision.

DETAILED DESCRIPTION

The present disclosure relates to a visual language processing modeling framework via an attention-on-attention (AoA) mechanism as will be described, as well as associated methods, systems, computer-readable mediums, etc. Manufacturing personalization has posed significant challenges to deploy high-fidelity artificial intelligence (AI) models in manufacturing. Notably, sample size becomes quite limited for product design and manufacturing processes under personalization, while mainstream AI models, such as the "deep learning" model, require a massive number of samples for training. Slow adoption of artificial intelligence models in manufacturing engineering prolongs lead time in new product realization.

Accordingly, human-AI collaboration may be beneficial such that human expertise is employed in manufacturing decisions, especially for personalized product realization. For example, in additive manufacturing (AM) (e.g., three-dimensional printing), a manufacturing quality inspection is generally performed by human experts by conducting a variety of tasks, for example, by visually searching a manufactured item for certain defective patterns. While artificial intelligence-based automated quality inspection systems have been attempted to reduce human workloads, highly-customized product designs in additive manufacturing processes have posed significant challenges for automated quality inspection systems. Notably, existing models trained using historical product data cannot be generalized to new products with limited samples. As such, humans still play an irreplaceable role in many quality inspection tasks as they have the ability to quickly and visually inspect items.

Accordingly, according to various embodiments, human expertise is captured using physiological measures which is thus integrated with data-driven artificial intelligence routines to improve detection and generation of features. For example, a human visual searching-based quality inspection task may be performed to classify product defects (e.g., nonconforming and conforming) of an additive manufacturing product having a relatively complex geometry. In other examples, a human visual searching-based quality inspection task may be performed to classify objects, such as in autonomous or semi-autonomous vehicles, that may be in or near a roadway.

Figure 1A:
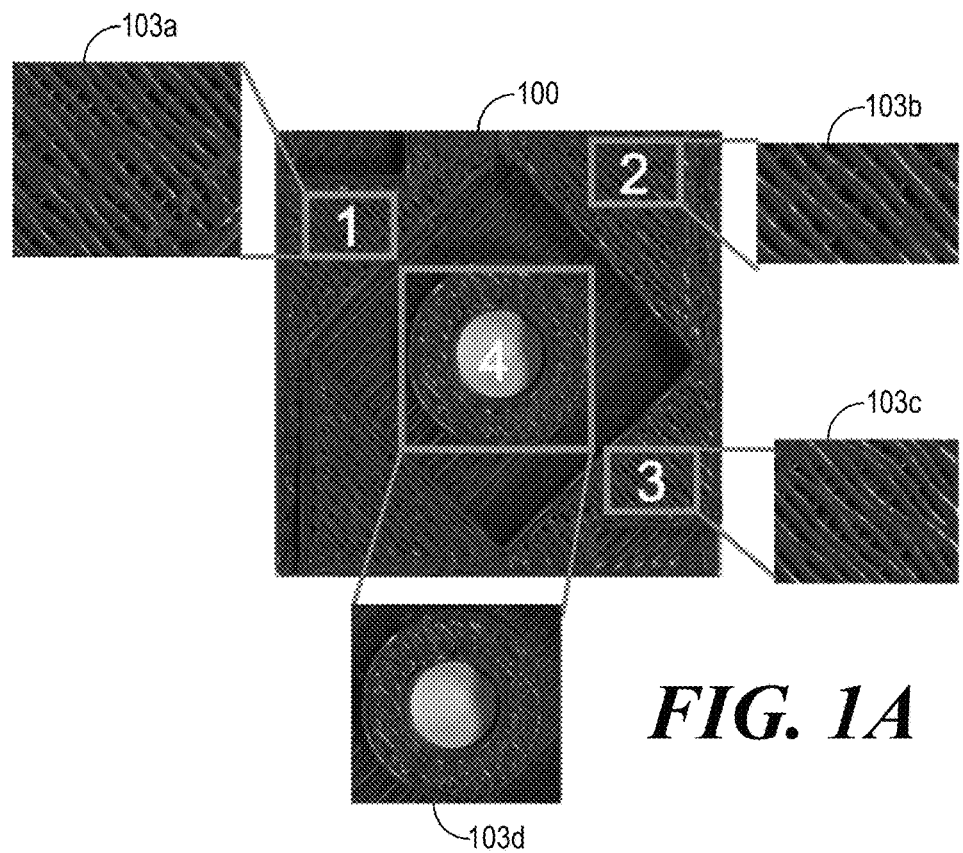
FIGS. 1A and 1B are examples of human visual searching-based quality inspection task in additive manufacturing, where
Figure 1B:
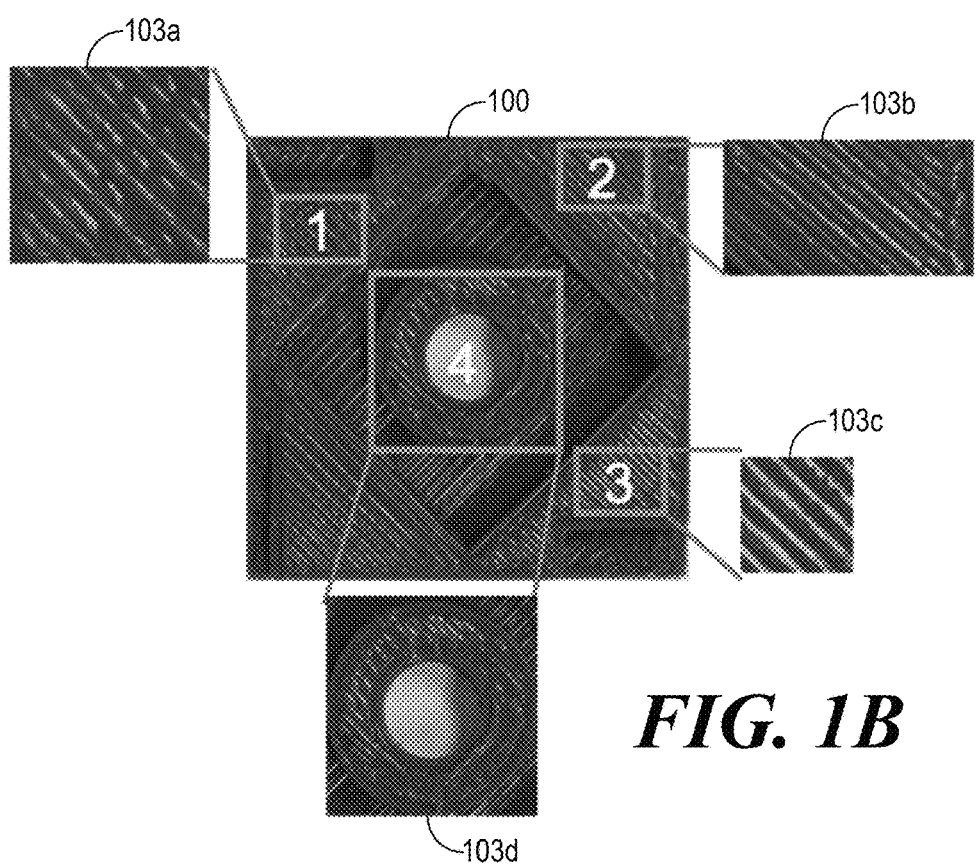

Turning now to the drawing, FIGS. 1A-1B show an example of an additive manufacturing item 100. Specifically, FIG. 1A shows a non-conforming additive manufacturing item 100 with high surface roughness, and FIG. 1B shows a conforming additive manufacturing item 100 with satisfactory surface roughness. An individual is required to manually and visually explore an additive manufacturing item 100 by classifying its surface roughness into either nonconforming, shown in FIG. 1A, or conforming, shown in FIG. 1B. The individual may look over an image and sequentially focus on several regions, such as regions 103a . . . 103d (collectively "regions 103") and make a determination based on various observations. In general, human inspectors with low visual fatigue levels will make more accurate decisions as compared to state-of-the-art, well-trained artificial intelligence models, especially when training sample sizes are limited. Human inspectors are more flexible to extend their knowledge to different product designs as human visual searching can provide rich information on significant features and dynamic variable selection. Therefore, quantifying and mimicking human visual searching processes are employed, which may be used to advance object detection, industrial automation, and so forth.

A comparison of a human visual searching process with well-established artificial intelligence models (e.g., residual neural network-based image classification models), are summarized in Table I below. Superior performance and flexibility of human visual searching-based quality inspection processes may be attributed to a human inspector learning local features by gathering different visual cues in local regions in a sequence, and local features are noted and jointly contribute to an inspection decision-making in a weighted manner (e.g., an attention score to reflect the attention resource allocated by the inspector). Accordingly, human visual searching patterns are employed herein to model human visual attention based on computational attention and guide feature extraction for use with artificial intelligence models and routines.

TABLE I

A Summary of Major Differences Between Human Visual Searching Process And AI Methods

| Human Visual Searching Process | Artificial Intelligence Methods (e.g., Image Classification Methods) |
|---|---|
| Human inspectors gather visual cues (i.e., identified by fixations) as evidence | AI methods take pixels as input Input images are padded in the same size |
| Visual cues are in different size | Pixels are equally treated considering their locations |
| Visual cues are ordered naturally in a sequence | Final decisions are drawn based on weighted feature maps (i.e., automatically extracted from convolutions) |
| Final decisions may only depend on only a few visual cues | |

Eye Tracking for Visual Attention Analytics. Eye tracking technology has been widely adopted in cognitive science to investigate human perception, attention, cognition, and the like. For example, eye trackers have been employed to study visual searching in reading where human gazes play an important role. In another example, eye tracking has been employed in a dynamic allocation of attention resources in regularity categorization user studies. In yet another example, eye tracking has been employed in mobile devices (e.g., augmented/mixed/virtual reality devices, personal laptops, etc.) to enable research activities to achieve better user experience and higher usability. Eye and attention management techniques enable natural communication between human users and conversational agents.

Computational Attention for Data-driven Analytics. As compared to visual attention analytics, attention mechanisms may be employed with data-driven artificial intelligence models to generate computational attention, thereby mimicking human selective attention where task-dependent volitional cues (e.g., identification of a cat from an image) directs attention to the regions 103 of an image that contain one or more cats. As a result, each pixel of an inspected image may be assigned an attention score to indicate its relationship with a decision. Estimated pixel-wise attention scores or attention scores for feature maps largely differ from human's selective attention, which are generally continuous. Therefore, pixel-wise attention scores in various scenarios do not adequately serve as a modeling framework to model the relationship between eye gazes from humans and decisions.

As such, according to various embodiments of the present disclosure, a modeling framework (e.g., a software architecture) is described that not only relates visual attention with visual searching decisions, but also identifies computational attention that directly contributes to the decision making performed by artificial intelligence routines. Therefore, artificial intelligence routines, such as those employed in object detection and analysis, are advanced by incorporating human visual searching-based feature extraction. Here, visual attention is represented by visual cues which are corresponding regions on the inspected image identified by fixations from eye gazes. Computational attention is represented by a subset of visual cues with high attention scores, which are estimated from the modeling framework to identify the importance of the visual cues. Hence, these mechanisms are referred to herein as (computational) attention on (visual) attention (AonA).

According to various embodiments, visual cues in a visual searching task may be formulated as a sentence, referred to herein as a visual language sentence, that is visually expressible by a human. Intuitively, not all the words in a sentence may significantly relate to a meaning of the visual language sentence. For a long visual language sentence, for example, only a few words, also referred to as keywords, may directly relate to the meaning of the visual language sentence. Therefore, a visual language processing (VLP) modeling framework is described herein whereby not only are visual words defined in a visual language sentence, but also an artificial intelligence-based routine (e.g., a deep learning-based routine or a CNN routine) may be employed to identify visual keywords. In this way, the VLP modeling framework can be interpretable to support attention scale visual searching analytics.

The VLP modeling framework in accordance with the various embodiments described herein may analyze and explain even counter-intuitive visual searching decision-making processes. For example, cognitive threats in the form of visual priming were proven to bias human visual inspection decision-making process. The short presence of visual primes may easily be ignored by traditional statistical testing and regression-based analytical methods. On the other hand, whether a human perceived the visual primes or not cannot be modeled by data-driven approaches since visual attention is not considered. The VLP modeling framework described herein may identify the hacking by the AonA mechanism, which was validated in a human visual searching-based quality inspection user study with the random presence of cognitive threats.

As eye gazes play a role in understanding human visual searching processes, eye tracking technology may be employed to track eye movements during visual searching. For example, eye trackers may be employed to track the reading patterns to support the understanding of reading preferences which includes, but is not limited to, text reading, picture reading, website reading, visualization reading, etc. Advancements in augmented, mixed, and virtual reality devices include eye tracking technology, sometimes embedded on a mobile computing device to improve usability and user experience. For example, eye trackers may be employed to investigate gaze shifts considering head and body movements in virtual reality to inform design of a three-dimensional user interface. Further, eye tracking technology may be employed to support human-computer interactions. As an example, an eye gaze-controlled web browser may emulate mouse and keyboard functionalities in user interfaces. In another example, eye trackers may investigate manufacturing operations, such as quality inspection, root-cause diagnosis, maintenance, etc. Though being widely adopted in many applications, effectively analyzing eye gaze data in visual searching tasks remains problematic.

Visual Attention Analytical Methods for Visual Searching Tasks. Visual attention in some scenarios may be categorized into bottom-up and top-down modeling paradigms. The bottom-up modeling paradigms may assume that the prominence of stimuli, which depends on features of the stimuli, directly determines the allocation of attention resources in visual searching tasks. Top-down modeling paradigms, on the other hand, consider a searching process in a task-oriented manner, along which attentional resources are selectively allocated according to task objectives.

In statistical tests and regression-based analysis, summary statistics from eye gazes of different participants are typically aggregated for the tests. For instance, average or maximal durations of fixations are typically used for aggregation. Such an aggregation directly leads to a huge loss of information that is contained by the transition of eye gazes, which cause rare events or short presence of visual stimuli to be easily ignored.

A frequent subgraph mining approach may be employed to mine statistically frequent subgraphs of eye gazes when performing visual searching tasks in different web-based visualization designs. These frequent subgraphs extracted from the transition pattern of fixations for each participant are used to understand individual reading patterns, which provide significant evidence to understand individual differences. As another example, behavioral patterns that are specific to certain users and task groups may be identified based on differential sequence mining. However, various models are limited to identifying behavioral patterns that cannot be directly used for quantitative analysis. For example, a set of summary statistics (e.g., mean duration, standard deviation of duration, etc.) extracted from behavioral patterns may be employed to build a personalized model. However, a selection of the summary statistics requires deep understanding of these behavioral patterns, and, as an aggregation of eye gazes, typically leads to loss of information. A quantitative modeling framework, as described herein, is advantageous for providing analysis of eye gazes with limited loss of information in visual searching tasks.

Computational Attention Mechanisms. Nadaraya-Watson kernel regression may be used to statistically mimic human visual attention for improvement of regression models. Specifically, the Nadaraya-Watson kernel regression mimics an attention pooling process, which are the interactions between volitional cues and nonvolitional cues by selectively aggregating sensory inputs to produce outputs. Nonparametric attention pooling weighs outputs according to their input locations. Hence, an output prediction depends on a most relevant input, which creates a simple imitation of human visual attention. Machine translation, on the other hand, may employ deep learning to parameterize an attention pooling kernel using neural network fully connected layers (e.g., also referred as additive attention). Content-based attention methods define the attention pooling kernel based on cosine similarity, location-based attention preserves local relations by defining attention pooling based on locations of a sequence, self-attention and multi-head self-attention methods consider both local and global relations of a sequence. A neural network structure, referred to as "Transformer," is defined based on self-attention and multi-head self-attention methods and has been applied to natural language processing and computer vision. Employment of super performance of computational attention in visual attention analysis remains an important yet challenging research question.

Visual Language Processing Modeling Framework. Now, a VLP modeling framework according to various embodiments is described as well as model architectures and the AonA. For this modeling framework, three assumptions may be made. First, visual cues are available for extraction based on eye gaze data, second, a size of a visual cue is exponentially proportional to the duration of a fixation, and, third, visual cues are correlated with human visual task searching decisions with different significance.

Figure 2:
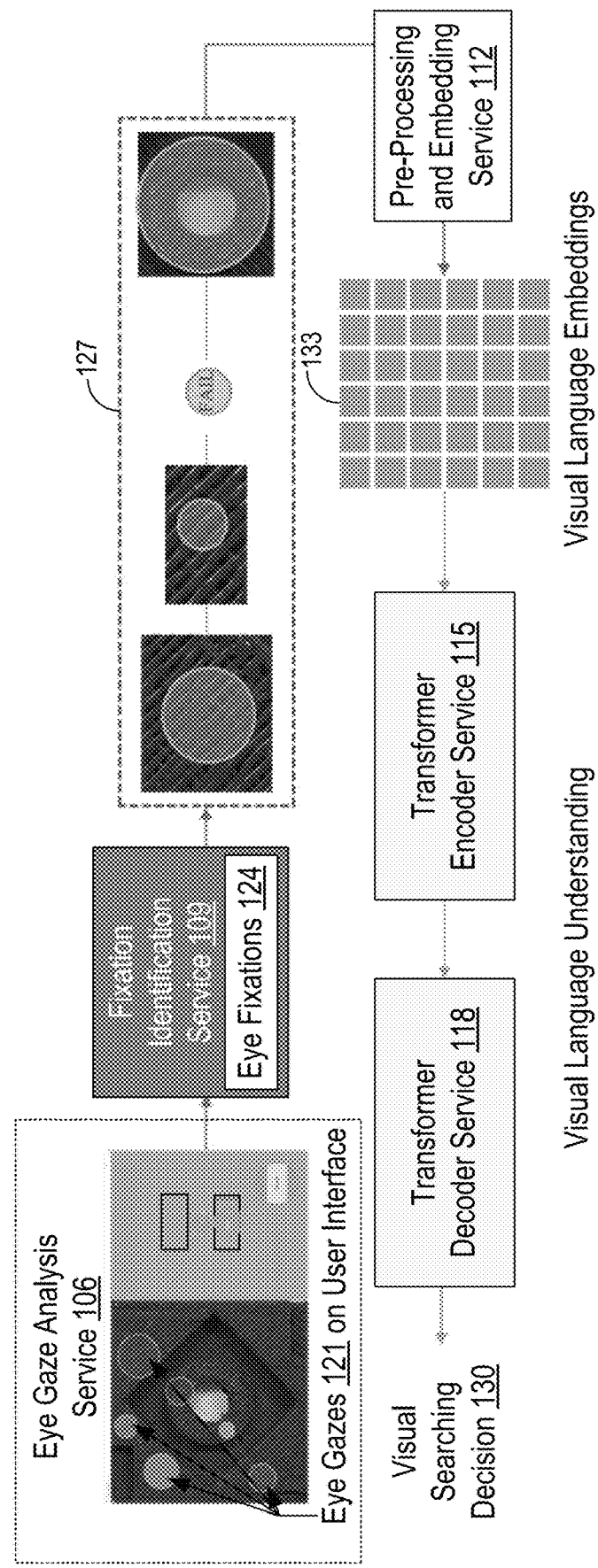
FIG. 2 is a pictorial diagram of an overview of a visual language processing (VLP) modeling framework according to various embodiments of the present disclosure.
Figure 8:
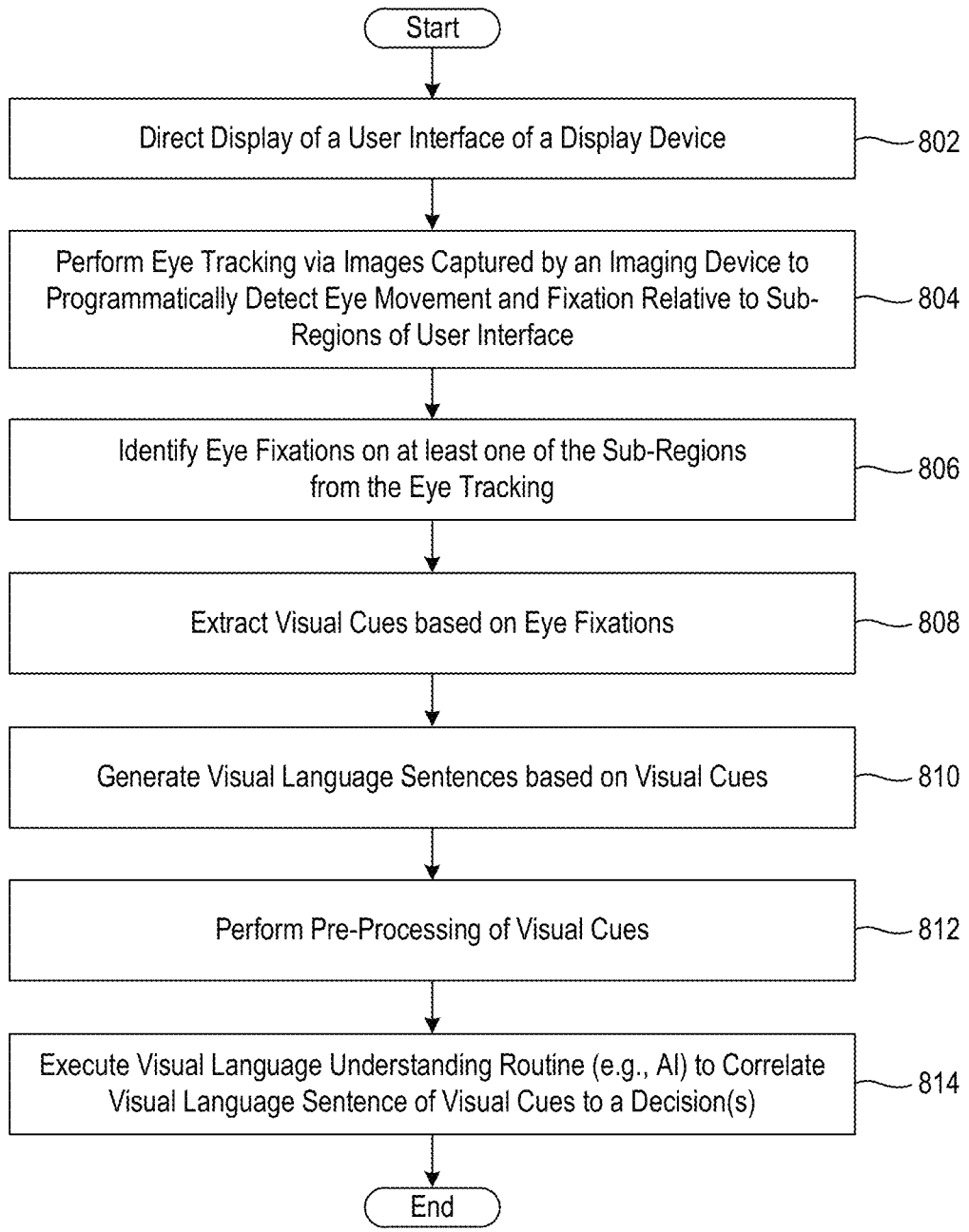
FIG. 8 is a flowchart illustrating one example of functionality implemented as portions of an application executed in a computing environment according to various embodiments of the present disclosure.

FIG. 2 is a schematic diagram illustrating an overview of a VLP modeling framework in accordance with various embodiments of the present disclosure. Generally, the VLP modeling framework may include an eye gaze analysis service 106, a fixation identification service 109, a preprocessing and embedding service 112, a transformer encoder service 115, a transformer decoder service 118, among others. The services may be stored in memory and executable on at least one computing device, such as a computing device having at least one hardware processor and a data bus. Additionally, the VLP modeling framework may include other artificial intelligence services, as will be described. FIG. 8 is a flowchart showing an example method according to various embodiments described herein. For example, FIG. 8 is a flowchart illustrating one example of functionality implemented as portions of an application executed in a computing environment according to various embodiments of the present disclosure.

Referring to FIGS. 2 and 8 collectively, first, at box 802, the eye gaze analysis service 106 may direct one or more user interfaces to be presented on a display device (e.g., a laptop display, a monitor, or the like), where the user interface may include an additive manufacturing item to be classified (e.g., conforming or non-confirming) or other object to be associated with a decision.

In box 804, eye tracking may be performed via images capturing by an imaging device or other sensor to programmatically detect eye movement and/or fixation relative to sub-regions of the user interface. In some embodiments, the eye gaze analysis service 106 interacts with hardware, such as a sensor or imaging device (e.g., a camera) to capture pixel data having eye gaze data therein. Eye tracking may be performed, for instance, using image data analysis (e.g., pixel analysis) captured by a sensor (e.g., a camera or other imaging device) to detect eye gazes 121 relative to the user interface or the components therein.

At box 806, the fixation identification service 109 may identify eye fixations 124 from the eye gazes 121. In some embodiments, the eye fixations 124 may include a data object being associated with various data, such as duration, pixel coordinates, order index, and so forth. In some embodiments, the eye fixations 112 are a tuple of duration, pixel coordinates, and order index.

Then, in box 808, visual cues 127 may be extracted from the user interface, or a screen capture thereof, based on the eye fixations 124. In some embodiments, the visual cues 127 are sub-regions of the user interface that may be organized in an ordered sequence with arbitrary length.

In box 810, a sequence of the visual cues 127 may be defined as a visual language sentence, which can be viewed as extracted features to support an artificial intelligence routine and training thereof. In box 812, pre-processing of the visual cues 127 or the visual language sentences may be performed. For instance, all of the visual language sentences may then be padded into a certain length and embedded into matrices by the pre-processing and embedding service 112. In box 814, a transformer-based visual language understanding module, comprising one or more of the transformer encoder service 115 and the transformer decoder service 118, may finally correlate the visual language sentences with decisions, referred to as a visual searching device 130. The AonA may be enabled by the visual language understanding module.

Accordingly, the VLP modeling framework aims to interpret eye gaze data as a type of visual language to extract meaningful features for artificial intelligence. Basic terms used in relation to the VLP modeling framework described herein are provided as an analog to natural language processing techniques. Table II summarizes the pairwise comparisons of this analogy.

TABLE II

Basic Definitions in VLP Modeling Framework as an Analog to Natural Language Processing Techniques

| Steps | VLP modeling framework | Natural Language Processing Techniques |
| --- | --- | --- |
| Data Preparation | Fixation<br>Visual cue<br>Visual sentence<br>Visual corpus | Encoding of word<br>Natural language word<br>Natural language sentence<br>Natural language corpus |
| Pre-Processing Routines | Fixation extraction<br>Visual cue normalization<br>Visual cue padding | Tokenization<br>Normalization<br>Padding |
| Modeling Routines | Visual cue embedding<br>Visual language modeling | Word embedding<br>Neural language modeling |

Data Preparation. Visual language may include various data concepts, e.g., fixation, visual cue, visual sentence, and visual corpus. Fixation may include a visual event that maintains visual eye gazes 121 on a single location. Therefore, eye fixations 124 may be identified from eye gazes 121 to support the analysis of visual attention. An eye fixation 124 may be treated as a basic element of the visual language, as numerical encoding is to natural language. Note that numerical encoding aims at providing a unique index for each word in a vocabulary. In some embodiments, an eye fixation 124 may only identify a location on a user interface, such that a visual cue 127 includes a corresponding local region of the user interface with a predetermined size.

In various embodiments, a visual cue 127 may be understood as a "word" visually expressible by an individual operator. As an individual operator cannot stare at more than one region of a user interface concurrently, visual cues 127 may be produced in a sequence or, in other words, an ordered list of their identification. The sequence produced in one visual searching task may include a visual sentence similar to a natural language sentence, which are generally in different lengths. Multiple sentences expressed by one individual may be organized into a visual corpus.

Preprocessing Methods. Given a natural language sentence, natural language processing techniques may require tokenization, which is a pre-processing step performed that separates a sentence into meaningful tokens, such as phrases or words. Similarly, fixation extraction may be a pre-processing step performed to identify eye fixations 124 from raw eye gazes 121. The visual cues 127 (e.g., regions in RGB color coding ranging from 0 to 255) may be extracted from eye fixations 124 and, in some embodiments, normalized to a range of 0~1.0 for convenience of computation for modeling. This may reduce computing resources (e.g., memory, central processing unit (CPU) processing time, and the like) when performing various calculations. However, arbitrary lengths of the visual sentences challenge existing machine learning routines, as the dimensionality of samples are typically assumed to be the same. Therefore, in some embodiments, non-informative cues (e.g., empty images with all zero pixels) may be added to short visual sentences, which is referred as "padding" in natural language processing techniques.

Modeling Methods. In natural language processing, word embedding techniques may be applied as top layers for deep learning AI routines. However, the perception mechanism of human vision system differs from that of human verbal systems. Specifically, a human vision system understands images by perceiving features, such as colors, contrasts, edges, etc. Hence, directly adopting word embedding techniques in VLP does not match the natural of human vision. Also, extensively defining a group of feature extraction methods will limit the generalizability to other research and applications. Thus, a convolutional neural network (CNN)-based visual cue embedding routine is described herein to represent a visual sentence as a numerical matrix 133, as shown in FIG. 2. The proposed visual cue embedding routine may be integrated with the visual language understanding model as the first layer of a neural network, for example.

Preprocessing for Visual Language Processing. Denote eye gazes 121 as a sequence of tuples $G_i = \{(t, x_t, y_t)\}_{t=1, \ldots, T_i}$, where $i=1, \ldots, N$ represents the i-th sample; $t=1, \ldots, T_i$ is the timestamp for the t-th eye gaze; and $x_t, y_t \in \mathbb{R}$ are corresponding pixel coordinates of the t-th eye gaze 121 bounded by the pixel size of the user interface. Note that one sample may be defined as $(G_i, y_i)$, where $y_i \in \mathbb{R}$ is the human visual searching decision, e.g., categorical variable for classification problem, and continuous variable for regression problem.

Fixation Identification. Following the architecture shown in FIG. 2, a fixation identification routine $f(\cdot | \text{maxdist}, \text{mindur})$ may be first applied to eye gazes 121 to extract eye fixations 124 as a sequence of tuples $F_i = f(G_i | \text{maxdist}, \text{mindur}) = \{(j, \tilde{x}_j, \tilde{y}_j, d_j, st_j, et_j)\}_{j=1, \ldots, M_i}$, where $j=1, \ldots, M_i$ denotes the j-th fixation; maxdist, mindur are two hyperparameters to set the maximal inter-gaze distance in pixels, and the minimal duration of a fixation in milliseconds, respectively; $(\tilde{x}_j, \tilde{y}_j)$ is the geometric center of the j-th identified fixations; $st_j$ and $et_j$ are start timestamp and end timestamp of the j-th fixation, respectively. In various embodiments, the pyGaze fixation identification routine may be employed although, in alternative embodiments, other types of fixation identification routines may be used.

Visual Cues Extraction. The visual cues 127 may then be defined based on the eye fixations $F_i$ 124 and the snapshots of the user interface $U_i = \{UI_j\}_{j=1,\ldots,M_i}$, where $UI_j$ is the j-th aggregated user interface snapshot. Note that $U_i$ is considered as a sequence since, in general, the graphics in an interactive user interface will change over time. An aggregation may be achieved in some embodiments by averaging all the recorded user interface snapshots in between $st_j$ and $et_j$. Therefore, the visual cues 127 include a local sub-region (e.g., a window) on the aggregated user interface. Specifically, the center of the j-th visual cue is $(\tilde{x}_j, \tilde{y}_j)$. Considering the assumption that the size of a visual cue 127 is exponentially proportional to the duration of a fixation, the size of the j-th visual cue is defined as $A \exp(B \cdot d_j)$, where A and B are two hyperparameters depending on the size of the user interface. Therefore, the visual cues in the i-th sample (i.e., the visual sentence) can be denoted as $V_i = \{UI_j[\tilde{x}_j, y_j, A \exp(B \cdot d_j)]\}_{j=1,\ldots,M_i}$, where $UI_j$ [x, y, r] represents a round window of the user interface snapshot $UI_j$, which is centered at (x, y) with radius as r. In some embodiments, a round window may be transferred to a rectangle window to be represented by a matrix without loss of information.

Visual Cue Resizing, Normalization, and Padding. In some embodiments, extracted visual cues 127 may be resized to a same or common size (width, height, 3) and may then be normalized to 0~1.0 range, which is denoted as $\tilde{V}_i$. Observing that the length of visual sentence $\tilde{V}_i$ differs from each other, a padding method may be employed to enforce a same length L for all N samples. Specifically, padding for a visual sentence may append all-zero matrices 0 in the size of (width, height, 3) to the end of $\tilde{V}_i$ as $\tilde{V}_i^P = \{\tilde{V}_i, 0_{M_i+1}, \ldots, 0L\}$. Such padding will not have significant impact to parameter estimation of the VLP modeling framework described herein a all-zero matrices may be masked in computing attention scores.

Model Architecture and Estimation. The padded visual sentence $\tilde{V}_i^P$ and the decision $y_i$ may include an input and an output for the natural language understanding routine, respectively. The architecture for this routine is graphically presented in FIG. 3, where neural network layers are presented in solid rectangles with a layer name at the center. Input and output layers are in solid, non-filled rectangles. Functional blocks are highlighted in dashed rectangles. In some embodiments, unless noted in FIG. 3, the ReLu activation function may be adopted for all the neural network layers to impose nonlinearity.

Figure 3:
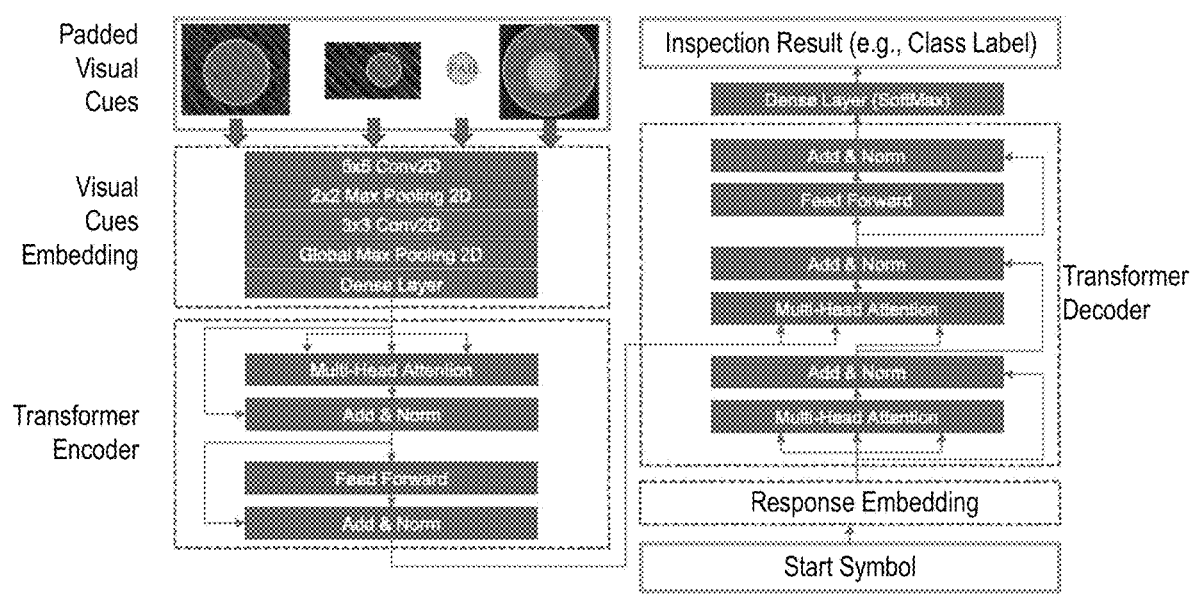
FIG. 3 is a visual language interpretation model architectural diagram according to various embodiments of the present disclosure.

The non-limiting example architecture of FIG. 3 includes a combination of two popular blocks, namely, a CNN block, and a transformer encoder-decoder block. The CNN block, for example, may mimic a human vision system for feature extraction (e.g., visual cues embedding). These features may relate to edges, contrasts, etc., and their effectiveness may be enforced by learning from training data in a model estimation process. In the CNN block of FIG. 3, each visual cue in a visual sentence may be processed by the same set of filters in the CNN block, thereby significantly reducing number of trainable parameters. This may improve operational efficiency of the process by using less computing resources, as may be appreciated.

The transformer encoder-decoder block may mimic human sequential processing of visual cues with attention mechanisms enabled by a multi-head attention layer. A sequence-to-sequence model may be employed as visual searching may include aggregating clues with sequential dependencies. The transformer may model long sequence and may have successful extensions to even documents and corpus. It is understood, however, that the CNN block and the transformer block may be substituted with other deep learning blocks. Compared with popular computer vision models, such as the DenseNet, EfficientNet, and the ResNet, the modeling framework described herein has significantly less number of parameters (e.g., 75,000 trainable parameters). Therefore, it can be efficiently trained on a CPU in a short time.

The modeling framework described herein may link the output of the transformer encoder to the decoder block to predict a class label (e.g., a classification). Note that the transformer decoder may require a sequence as input, thus a start symbol (e.g., a numerical integer −1) may be used as the start point for a decision-making process. The advantage is notable as the top multi-head attention layer in the transformer decoder block enables an attention scoring mechanism which provides an attention score matrix $\text{Attn} \in \mathbb{R}^{L \times 1}$ as an indication of computational attention. Such computational attention identifies the significance of each visual cue 127 in a visual sentence. The higher the $\text{Attn}_j$ score, the corresponding visual cue $\tilde{V}_{ij}^P$ contributes to the decision $y_i$ in a more significant manner. It also enables sequence prediction to analyze sequential decision-making process, when decision of a visual searching task includes a sequence of responses, e.g., filling out a post experiment survey with multiple questions.

This model architecture hence enables the proposed AonA mechanism. Specifically, visual attention is represented by the visual cues $V_i$ 127 for the i-th visual sentence, and the computational attention is provided by the Attn score to imply the significance of the visual cues based on the visual attention. This AonA mechanism introduces visual interactions of a user with a user interface in a natural way, which is expected to provide significant improvement for modeling performance (e.g., the classification accuracy) with high interpretability (e.g., providing dynamic variable selection for operators to understand the neural network model).

The VLP modeling framework described herein follows estimation and inference of a transformer known in the related art. Specifically, the model may require to organize an input as $\tilde{V}_i^P$, and reorganize the output as a tuple of (−1, $y_i$), where −1 is the start symbol indicating the start of decision-making. Gradient-based optimizers, such as Adam, may be used for efficient model estimation. In the model inference stage, besides training input $\tilde{V}_i^P$, the Start Symbol −1 should also be used to trigger prediction for the transformer decoder.

User Study with Cognitive Threats. The VLP modeling framework described herein provides explanations for even counter-intuitive visual searching decisions. Data collected from an earlier user study of human visual searching-based quality inspection with cognitive hacking was used for evaluation. In manufacturing quality inspection, cognitive hacking aims at biasing human decision-making processes in visual searching tasks, hence sabotaging product quality. In the earlier user study, priming was used as a form of cognitive hacking and was proven to have significant effects on decision-making via statistical tests. However, explaining biased decisions from an attention perspective remains a challenge due to the short presence of priming. Therefore, the VLP modeling framework as described herein was employed for attention level explanation based on the AonA mechanism.

Figure 4:
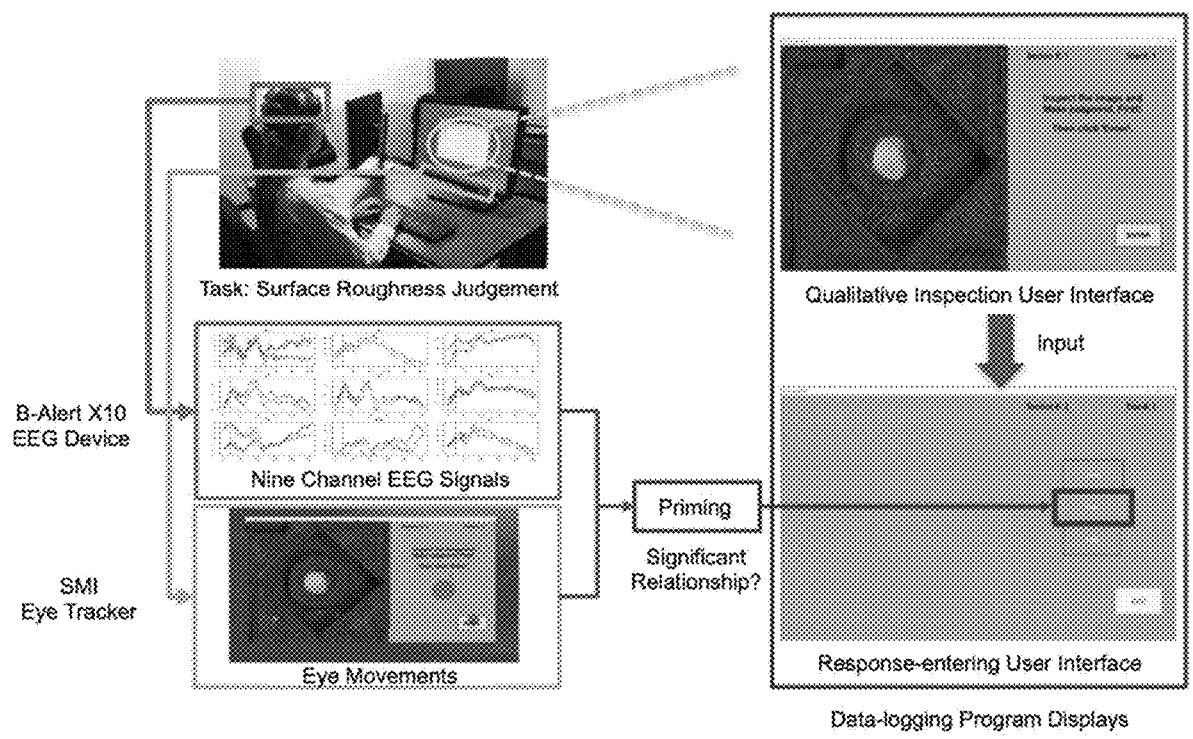
FIG. 4 is a schematic of an experimental setup for generating experimental results according to various embodiments of the present disclosure.

Experimental Setup—Apparatus and Participants. A user study employed a computer workstation that was connected to two 24″ (1920*1200 resolution) display devices (e.g., computer monitors). As shown in FIG. 4, a first monitor facing the participant presents a user interface for quality inspection and response-entering, whereas a second monitor may be used for an administrator to monitor a participants' real-time electroencephalogram (EEG) signals and eye movements. On the first monitor, a SMI® REDn remote eye tracker (20 Hz) was installed to collect participants' eye movements and register onto the screen's pixel coordinates. Participants were equipped with a 10-channel ABM® B-Alert X10 wireless EEG headset (256 Hz, Electrocardiography (ECG), Fz, F3, F4, Cz, C3, C4, POz, P3, P4). For synchronization, an external synchronization unit (ESU) was adopted to align the eye movements and EEG signals with the same timestamp before transmitting to a memory (e.g., a data store or database) deployed on the computing device. In addition, a database was deployed on the computing device to receive and store both the dataflows from the ESU and the inspection decisions made by the participants. Only the mouse was provided for participants as the input tool. In total, twenty participants were recruited from the community of graduate and undergraduate students, including eight females and twelve males (age range is 20~33, average age is 26.15). All the participants had normal vision and had no physical nor psychological difficulty in performing visual searching tasks.

Figure 5:
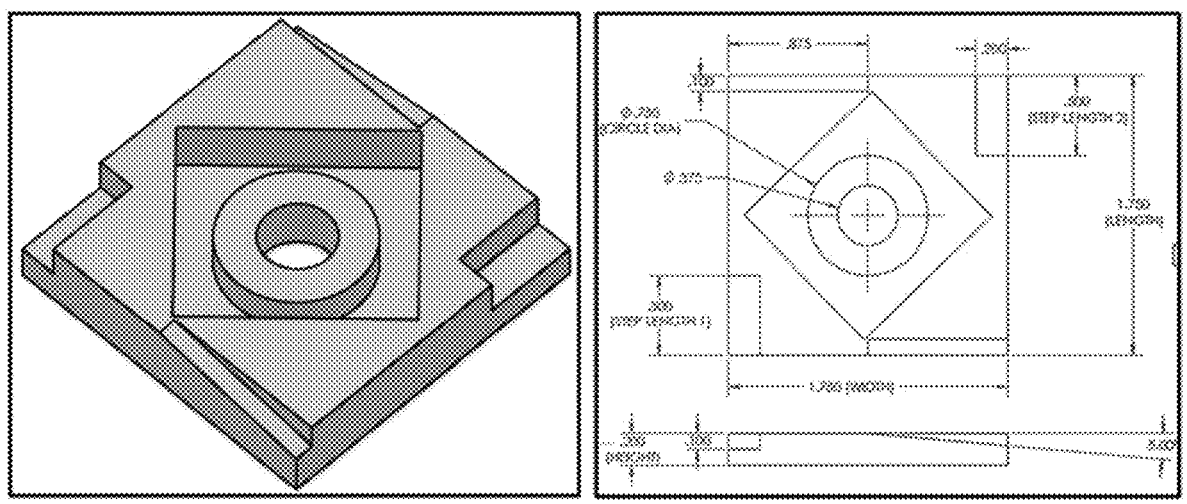
FIG. 5 is an additive manufacturing product design and associated geometries.

Additive Manufacturing Products and Inspection User Interface. A modified version of the NIST standard part NAS 979 was used for additive manufacturing processes, as shown in FIG. 5. In total, twenty products (ten defective and ten conformal) were used for the experiment, and another six products (six defective and six conformal) were used for training and practice. The true quality response was measured based on a profilometer. The quality inspection task required a participant to explore a snapshot of the top surface of one product, then qualitatively judge whether the surface roughness is "FAIL" (e.g., defective) or "PASS" (e.g., conformal).

Referring again to FIG. 4, the inspection user interface is show, which may be composed of a qualitative inspection user interface for participants to explore the surface and judge the surface roughness and a response-entering user interface to input the decision made by the participant. Priming "FAIL" is presented on the response-entering user interface randomly according to the experiment design and is located in between the PASS and FAIL buttons. This priming stimulus was designed to present about 80 ms after switching from the qualitative inspection user interface to the response-entering user interface for 32 ms every two seconds until completed the current trial by clicking "END" button. The presence of priming varied among four blocks. Each block contained twenty trails. That is, all the trails in two of four blocks presented priming, and all the trails in the rest two blocks did not present priming.

Procedures. After a brief introduction for the experiment, a background questionnaire was required to be filled out. Then, the participants received training and practice on additive manufacturing quality inspection task. No prime-related information was provided for participants. While performing visual searching-based quality inspection tasks, participants clicked a "START" button to start an experiment block, in which twenty trials were randomly assigned. For each trial, participants first inspected the surface of a part, then clicked on "ENTER" to start providing decision of this inspection. After selecting either "PASS" or "FAIL" on the response-entering user interface, the participant clicked on "END" button to complete current trial. After finishing each experiment block, the participant clicked on "DONE" button to report completion of one block and took a rest for around three minutes. When all four blocks were completed, the participant was required to perform a test block of priming detection task, which aimed at evaluating whether the participant had the ability to perceive the priming.

Evaluation Method and Benchmark Comparison. To evaluate the performance of the proposed VLP modeling framework, only the eye gazes $\{G_i\}_{i=1, \ldots, N}$ and the decisions $\{y_i\}_{i=1, \ldots, N}$ were used. After removing missing data, in total N=1295 samples were obtained. Again, the samples were randomly separated into three data sets, i.e., training data set (828 samples), validation data set (208 samples), and testing data set (259 samples). Here training data set was used for model parameter estimation, validation data set was used to select the best model associated with the highest classification accuracy, and testing data set as unobserved samples was adopted to evaluate the selected model. Since the decision $y_i$ was a binary variable in this user study, we adopted classification accuracy, precision, recall, F1 score, Type I and Type II errors as the evaluation metrics.

Benchmark comparisons were conducted in three scenarios, namely, (S1) only the snapshots of the user interface (contain priming if presented) were considered for modeling, (S2) only the fixations $\{F_i\}_{i=1, \ldots, N}$ were considered for modeling, and (S3) only the padded visual cues $\{\tilde{V}_i\}_{i=1, \ldots, N}$ were considered for modeling. Specifically, Scenario (S1) evaluates whether state-of-the-art deep learning-based computer vision models can learn the decision-making process purely from the snapshots of the user interface. Therefore, DenseNet, EfficientNet, and ResNet were selected as benchmark models. Additionally, $\{UI_{ij}\}_{i=1, \ldots, N, j=1, \ldots, M_i}$ was taken as input for the aforementioned models. Scenario (S2) aims to understand a significance of fixations for classification, hence only taking $\{F_i\}_{i=1, \ldots, N}$ as input for a transformer encoder model. Here, the transformer encoder model is selected since the fixations are sequences with different lengths, which match the input format of the transformer encoder model, and the transformer encoder model has been adopted as ViT for image classification. Scenario (S3) includes targeting and evaluating the modeling performance by only considering the padded visual cues without formulating them as visual language sentences. Hence, the padded visual cues were stacked in the channel dimension as a super image for one sample, e.g., a (width, height, 3L) image. In this way, the DenseNet, EfficientNet, and ResNet routines were employed to evaluate the classification performance, e.g., named as DenseNet_VC, EfficientNet_VC, and ResNet_VC, respectively.

Besides the aforementioned three scenarios, two more benchmarks were considered for the visual language-based scenario, e.g., a VLP modeling framework with only the transformer encoder (i.e., named as VLP_enc), and a VLP modeling framework with three stacked transformer encoder-decoder blocks (i.e., named as VLP_enc_dec_3T). By comparing the proposed VLP_enc_dec with VLP_enc, the benefits of adding the transformer decoder can be demonstrated. In addition, as more computational resources are available, the VLP modeling framework may achieve better modeling accuracy by readily stacking more transformer encoder-decoder blocks.

Both the proposed models and benchmark models were trained based on the same training, validation, and testing data sets. An epoch was set to be one-hundred for models to converge. The hyperparameters for all the benchmark models are similar to what was reported in the corresponding original articles with limited tuning efforts to achieve the best modeling performance.

VLP Modeling Results. Table III summarizes the VLP modeling results and benchmark comparison results, where total number of trainable parameters are reported to demonstrate the efficiency of the proposed VLP modeling framework. The significant best accuracies are highlighted in bold.

TABLE III

Summary of VLP Modeling Results and Benchmark Comparison Results

| Scenarios | Model | Precision | Recall | F1 | Type I | Type II | Accuracy | No. Trainable Parameters |
|---|---|---|---|---|---|---|---|---|
| Visual Language-Based | VLP_enc | 0.9612 | 0.9465 | 0.9538 | 0.0390 | 0.0534 | 0.9537 | 30K |
| | VLP_enc_dec | 0.9549 | 0.9695 | 0.9621 | 0.0468 | 0.0305 | 0.9614 | 75K |
| | VLP_enc_dec_3T | 0.9765 | 0.9541 | 0.9652 | 0.0234 | 0.0458 | 0.9652 | 209K |
| Image-based | DensNet | 0.5259 | 0.5419 | 0.5338 | 0.4885 | 0.4580 | 0.5267 | 7M |
| | EfficientNet | 0.5833 | 0.5343 | 0.5577 | 0.3816 | 0.4656 | 0.5763 | 7.1M |
| | ResNet | 0.5166 | 0.4732 | 0.4940 | 0.4427 | 0.5267 | 0.5152 | 23M |
| Fixations-Based | Vanilla Transformer | 0.8016 | 0.7404 | 0.7698 | 0.1875 | 0.2595 | 0.7760 | 2.4K |
| Visual Cues-based | DenseNet_VC | 0.7666 | 0.7022 | 0.7330 | 0.2187 | 0.2977 | 0.7413 | 7.2M |
| | EfficientNet_VC | 0.6464 | 0.4885 | 0.5565 | 0.2734 | 0.5114 | 0.6061 | 7.8M |
| | ResNet_VC | 0.7285 | 0.7786 | 0.7527 | 0.2968 | 0.2213 | 0.7413 | 24M |

Figure 6:
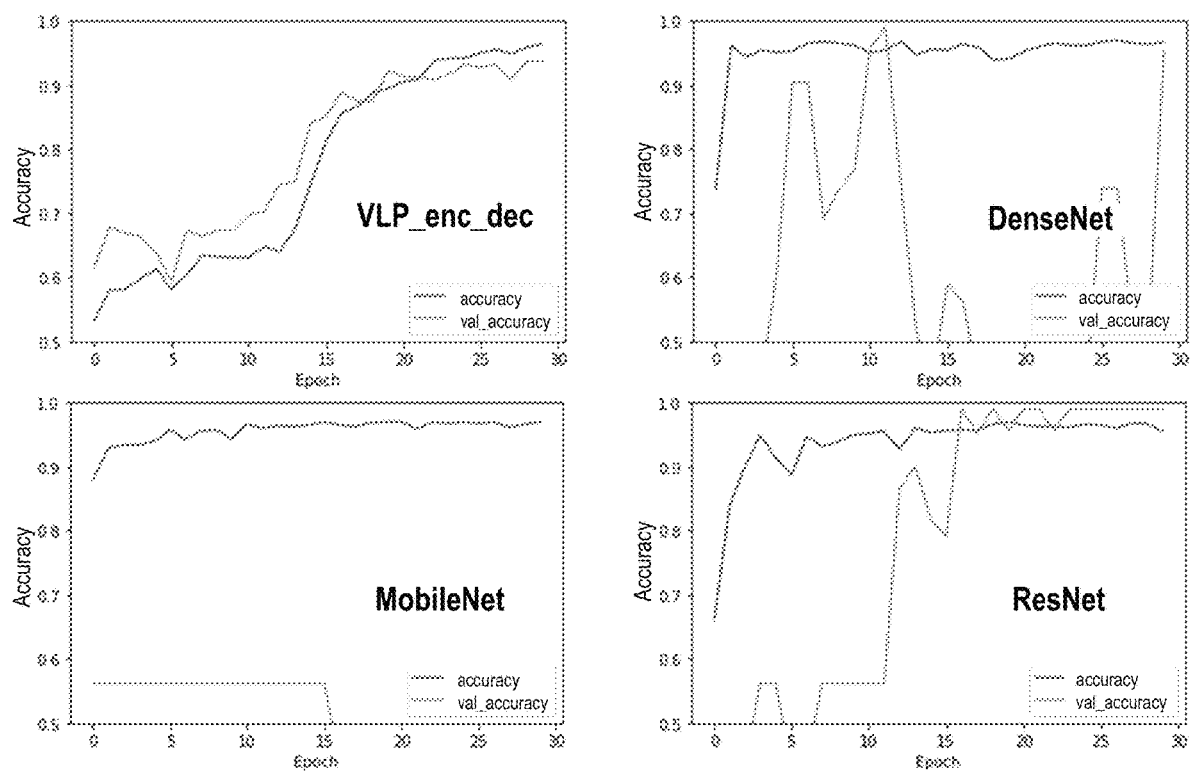
FIG. 6 is various convergence plots for benchmark models in thirty epochs according to various embodiments of the present disclosure.

For diagnosis purposes, the convergence of the VLP_enc_dec, DenseNet, EfficientNet, and ResNet routines were further investigated. The training and validation accuracies in thirty epochs are visualized in FIG. 6. Specifically, FIG. 6 includes four convergence plots for benchmark models in third epochs, where the darker line represents the training accuracy over epochs, and the lighter line represents the validation accuracy over epochs.

Figure 7A:
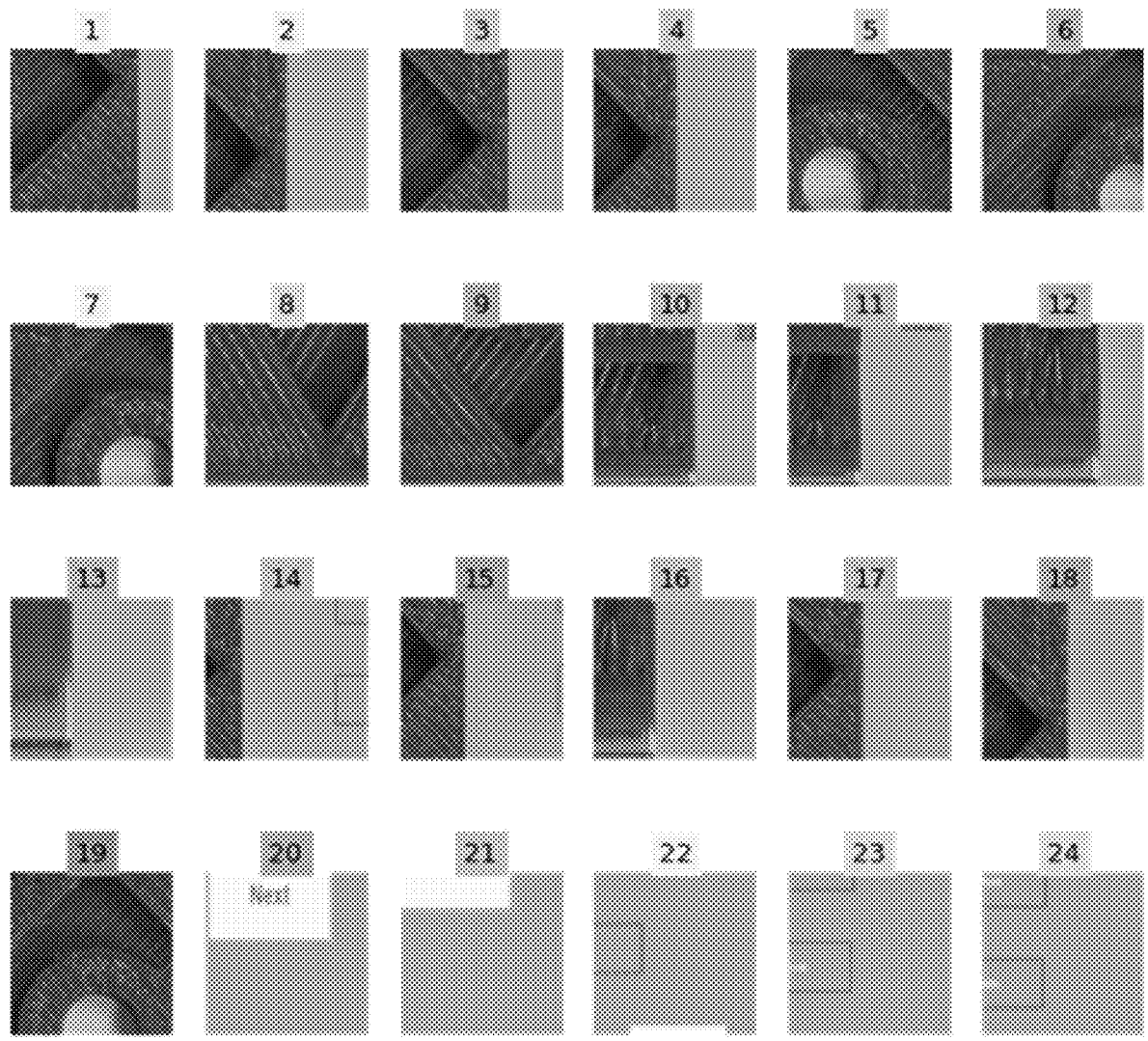
FIGS. 7A-7C are examples of visualized computational attention on visual attention (AonA), where FIG. 7A visualizes AonA without priming.
Figure 7B:
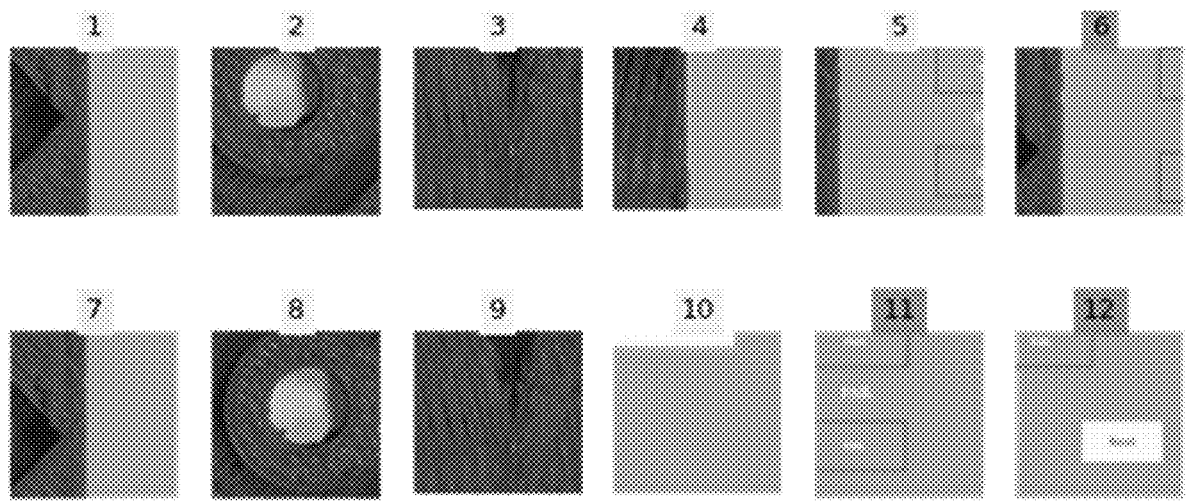
Figure 7C:
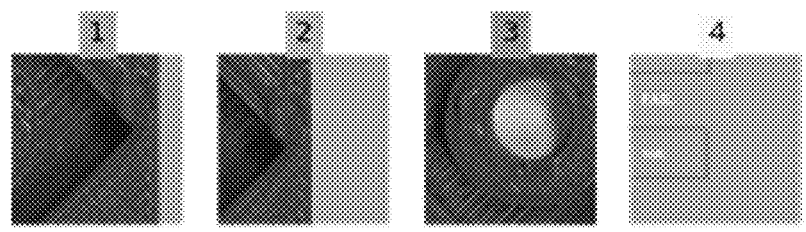

Visualization of AonA. The results of the proposed AonA mechanism on three randomly selected samples are presented in FIGS. 7A-7C, where visual cues 127 are visualized in subplots, order of the visual cues are labeled as titles of the subplots, and an attention score (e.g., significance) of the corresponding visual cue 127 is represented by the transparency of the title's color. Namely, a higher transparency represents lower attention score, and vice versa. FIG. 7A visualizes the AonA for one visual sentence without the presence of priming. FIGS. 7B and 7C shows the AonA for one visual sentence when priming presented (e.g., a "FAIL" can be observed in the last few visual cues). FIG. 7B corresponds to a decision biased by the presence of priming, whereas FIG. 7C leads to an unbiased decision.

Analysis of VLP Modeling Performance. The superior classification performance of the VLP modeling framework described herein is demonstrated in Table III above. In general, formulating eye gazes 121 as a visual language yields significantly the best performance over all the benchmark models in all scenarios, e.g., all the performance metrics of models in the visual language-based scenario are significantly higher than the performance of benchmark models in other scenarios. In an image-based scenario, all three benchmark models cannot quantitatively understand the visual searching decision-making, which leads to poor classification performance. The reason may be due to the lack of information for the participants' visual interactions with the user interfaces. Specifically, without considering the interactions, benchmark models in the image-base scenario target on modeling relationships between the user interface with the quality inspection decisions, which, intuitively, cannot provide satisfactory performance. An overfitting problem can be expected, which is evidenced by the convergence plots in FIG. 6.

The importance of the information contained in the participants' visual interactions with the user interfaces is further explored. When comparing the image-based scenario with the fixations-based scenario, one can easily observe the significant improvement in modeling performance. As such, the sequences of visual attention reflected by fixations $\{F_i\}_{i=1,\ldots,N}$ can provide some information to support the decision-making process modeling. However, classification accuracy is not satisfactory by only considering eye fixations 124, since no visual cues are considered to understand what the participants have observed during the visual searching. Therefore, the visual cues-based scenario are then compared, where the visual cues are stacked in the channel dimension to form a super image with the other benchmark scenarios. This scenario presents significantly better classification performance than the image-based scenario. Such advantage can be attributed to the extra information contained in the segmentation of the original user interfaces into different visual cues 127. However, the padded visual cues 127 have also introduced extra outliers (e.g., the unmasked all-zero matrices) for the benchmark models, hence limiting the classification performance.

Besides the comparison with benchmark scenarios, for the proposed visual language formulation, different model structures are also compared. As summarized in Table I, when comparing the VLP_enc with VLP_enc_dec, an improvement can be readily observed as the transformer decoder is added, which demonstrates the advantage of introducing the transformer decoder in a classification model. Moreover, employing more transformer encoder-decoder blocks can slightly enhance the classification performance of the VLP modeling framework, which is evidenced by comparing VLP_enc_dec with VLP_enc_dec_3T. Therefore, when computational resources are sufficient or available, one more transformer encoder-decoder blocks may be employed to achieve improved modeling performance. Adding such blocks will not have impact on the visualization of AonA, as the attention scores will always be computed at the last multi-head attention layer.

The VLP modeling framework described herein yields the best classification performance due to the joint consideration of both information contained in eye fixations 124 and information expressed by visual cues 127. Such advantages also demonstrate the flexibility of human visual searching mechanism over existing machine learning methods. The superior performance also implies the effectiveness of the visual searching-based feature extraction to support AI incubation. Specifically, with more informative features extracted from visual searching behaviors, the AI can be better incubated, hence achieving higher classification accuracy.

Analysis of AonA. Beyond classification performance, the VLP modeling framework described herein provides an important AonA mechanism as a quantitative understanding of the visual searching decision-making process. This is advantageous for the VLP modeling framework described herein to serve as an analytical tool for eye gazes in visual searching tasks. For example, as presented in FIG. 7A, when no priming was presented, the attention scores for the last few visual cues are lower (e.g., lighter colored titles), whereas the attention scores for the additive manufacturing product-related visual cues are higher (i.e., darker colored titles).

This indicates that the participant made the decision mainly based on the inspection of the production surface roughness. When priming was presented, as shown in FIGS. 7B and 7C, two different behaviors were observed. Namely, FIG. 7B identifies high attention scores for the last two visual cues, which are corresponding to a response-entering process biased by the priming. As the participant inputted a "FAIL" decision for a conformal product quality, to quantitatively understand this "counter-intuitive" decision, the VLP modeling framework assigned high attention scores for the visual cues where the priming was observed. Interestingly, even though the participant represented in FIG. 7C had observed the priming, its decision was not biased by the priming. This decision-making process was reflected in high attention scores for the product-related visual cues and low attention score for the priming-related visual cues. As such, the AonA mechanism enabled by the VLP modeling framework described herein can be used to understand visual searching decision-making process from the perspective of attention. Such advantage also demonstrates the effectiveness of integrating visual attention with computational attention mechanisms in the eye gaze analysis.

The aforementioned advantages are expected to benefit real-world research activities and application deployments regarding human visual searching performance modeling. In data collection, for an interactive user interface, both the eye gazes and the snapshots of user interface may be collected and time-aligned by a synchronization unit (e.g., either standalone hardware or a software). Response(s) for a visual searching task may also be recorded to define one sample. When multiple responses are expected for one visual searching task, all of the responses may be organized in a sequence with the same order when they were provided for one sample.

Data preprocessing may then be performed. For instance, fixations, padded visual cues, and visual sentences may be obtained by following the procedure described above. Note that samples may be cleaned to ensure no missing values present in either eye gazes 127, snapshots of user interfaces, and the responses.

The visual language understanding routine as described may be programmed in Python or other suitable language using a deep learning platforms, such as Google® TensorFlow, Facebook® PyTorch, Apache® MXNet, and so forth. Hyperparameters of the model may be adjusted to tune the modeling performance. When computation alresources are limited, one may consider deploying the VLP_enc or the VLP_enc_dec model for efficient training and inference. As sufficient computation resources become available, more transformer encoder-decoder blocks can be stacked to implement VLP_enc_dec_TX model, where X is the number of such blocks.

Visualization of AonA. Based on the last multi-head attention layer of a well-trained model, the attention scores will be calculated as Attn∈R (L×q). The visualization of the attention scores depends on the number of decision responses q. For example, q=2 identifies two responses for a visual searching decision. Thus, the first column of Attn identifies the attention scores related to the first response, and the second column corresponds to the second response. It should be noted that the VLP_enc is designed only for the purpose of modeling and prediction, but cannot support the visualization of AonA.

The modeling framework described herein may support visual searching analysis and may be readily extended to other applications, e.g., the usability studies to quantitatively link users' visual behaviors with usability issues/ratings; the attention analysis in augmented/mixed/virtual reality systems to understand users' attention in a three-dimensional space which has significant impacts on user experience; online experiments to understand users' preferences (e.g., online shopping preference, multimedia preference, etc.) on web pages by similarly formulating a mouse-moving language processing problem, and so forth. Many visual searching- and searching-related applications can benefit from the proposed framework.

Human expertise has been playing an important role in incubating artificial intelligence (AI) in cyber-manufacturing systems to enhance the process modeling, monitoring, and quality control. Meaningful features from raw data are typically generated as a numerical representation of human expertise to support better AI modeling performance. For example, the human visual searching patterns can imply informative features in manufacturing inspection, which will augment image processing methods to generate more significant features for the supervised learning-based AI inspection tasks. Hence, quantitatively understanding human visual searching process will not only advance the knowledge preservation of human expertise, but also enhance the AI modeling performance by imitating the human visual searching process. Thanks to the advancement of eye tracking technologies, a general visual language processing modeling framework is described to provide AonA based on eye movements. Specifically, VLP organizes the transition of fixations (e.g., extracted from eye movements to represent visual attention) as a visual sentence. Then, the VLP modeling framework correlates the visual sentence with the visual searching decision (e.g., defect classification in a manufacturing inspection task) by identifying the most significant word in the visual sentence (e.g., computational attention). This VLP modeling framework is expected to explain visual searching decisions via AonA even for counter-intuitive scenarios when cognitive threats bias human decision making. A real case study of an additive manufacturing inspection with twenty participants was performed to validate the proposed methods. The results indicated that VLP modeling framework enhanced the data-driven feature generation methods by providing additional AonA features.

Incubating AI methods to achieve better modeling performance becomes crucial in cyber-manufacturing systems, especially when highly personalized products pose significant challenges to industrial automation. For example, due to the flexibility of additive manufacturing processes, human visual searching-based quality inspection tasks are still widely involved to determine whether the product quality is conforming or not conforming.

Figure 9:
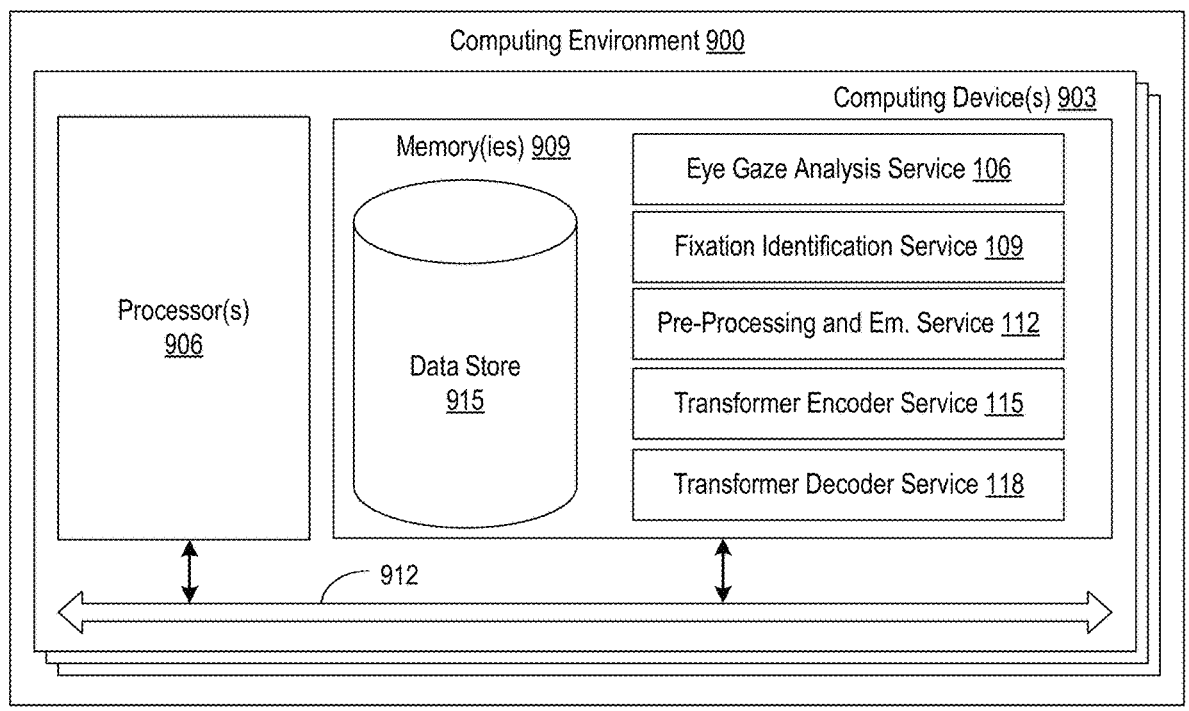
FIG. 9 is a schematic block diagram that provides one example illustration of a computing environment employed according to various embodiments of the present disclosure.

With reference to FIG. 9, shown is a schematic block diagram of a computing environment 900 according to an embodiment of the present disclosure. The computing environment 900 includes one or more computing devices 903. Each computing device 903 includes at least one processor circuit, for example, having a processor 906 and a memory 909, both of which are coupled to a local interface 912. To this end, each computing device 903 may comprise, for example, at least one server computer, desktop computer, laptop, or like device. The local interface 912 may comprise, for example, a data bus with an accompanying address/control bus or other bus structure as can be appreciated.

Stored in the memory 909 are both data and several components that are executable by the processor 906. In particular, stored in the memory 909 and executable by the processor 906 are the eye gaze analysis service 106, the fixation identification service 109, the pre-processing and embedding service 112, a transformer encoder service 115, a transformer decoder service 118, and potentially other applications and routines (e.g., various AI routines). Also stored in the memory 909 may be a data store 915 and other data. In addition, an operating system may be stored in the memory 909 and executable by the processor 906.

It is understood that there may be other applications that are stored in the memory 909 and are executable by the processor 906 as can be appreciated. Where any component discussed herein is implemented in the form of software, any one of a number of programming languages may be employed such as, for example, C, C++, C #, Objective C, Java®, JavaScript®, Perl, PHP, Visual Basic®, Python®, Ruby, Flash®, or other programming languages.

A number of software components are stored in the memory 909 and are executable by the processor 906. In this respect, the term "executable" means a program file that is in a form that can ultimately be run by the processor 906. Examples of executable programs may be, for example, a compiled program that can be translated into machine code in a format that can be loaded into a random access portion of the memory 909 and run by the processor 906, source code that may be expressed in proper format such as object code that is capable of being loaded into a random access portion of the memory 909 and executed by the processor 906, or source code that may be interpreted by another executable program to generate instructions in a random access portion of the memory 909 to be executed by the processor 906, etc. An executable program may be stored in any portion or component of the memory 909 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 909 is defined herein as including both volatile and nonvolatile memory and data storage components. Volatile components are those that do not retain data values upon loss of power. Nonvolatile components are those that retain data upon a loss of power. Thus, the memory 909 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 906 may represent multiple processors 906 and/or multiple processor cores and the memory 909 may represent multiple memories 909 that operate in parallel processing circuits, respectively. In such a case, the local interface 912 may be an appropriate network that facilitates communication between any two of the multiple processors 906, between any processor 906 and any of the memories 909, or between any two of the memories 909, etc. The local interface 912 may comprise additional systems designed to coordinate this communication, including, for example, performing load balancing. The processor 906 may be of electrical or of some other available construction.

Although the services, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart of FIG. 8 shows the functionality and operation of an implementation of portions of the VLP modeling frame. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 906 in a computer system or other system. The machine code may be converted from the source code, etc. If embodied in hardware, each block may represent a circuit or a number of interconnected circuits to implement the specified logical function(s).

Although the flowchart of FIG. 8 shows a specific order of execution, it is understood that the order of execution may differ from that which is depicted. For example, the order of execution of two or more blocks may be scrambled relative to the order shown. Also, two or more blocks shown in succession in FIG. 8 may be executed concurrently or with partial concurrence. Further, in some embodiments, one or more of the blocks shown in FIG. 8 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic, service, or application described herein that comprises software or code can be embodied in any non-transitory computer-readable medium for use by or in connection with an instruction execution system such as, for example, a processor 906 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic, service, or application described herein may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 903, or in multiple computing devices in the same computing environment 900. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
   at least one computing device; and
   program instructions stored in memory and executable in the at least one computing device that, when executed, direct the at least one computing device to:
   direct a display of a user interface on a display device, wherein the user interface comprises a manufacturing item to be classified as conforming or non-conforming;
   in association with the display of the user interface, perform an eye tracking via images captured by an imaging device to programmatically detect eye movement and fixation relative to a plurality of sub-regions of the user interface associated with the manufacturing item;
   identify a plurality of eye fixations on at least one of the plurality of sub-regions from the eye tracking;
   extract a plurality of visual cues from the user interface based at least in part on the plurality of eye fixations, the plurality of visual cues being in a sequence of identification;
   generate a visual language sentence based at least in part on the plurality of visual cues as extracted; and
   executing a visual language understanding routine to correlate the visual language sentence of the plurality of visual cues in the sequence of identification to at least one decision, the at least one decision comprising a classification decision to classify the manufacturing item as conforming or non-conforming.

2. The system of claim 1, wherein:
   the plurality of eye fixations are associated with a gaze duration, pixel coordinates, and an order index; and
   the plurality of visual cues are extracted from the user interface based at least in part on the gaze duration, the pixel coordinates, and the order index.

3. The system of claim 1, wherein the visual language sentence of the plurality of visual cues in the sequence is correlated to at least one decision by:
   generating an attention score matrix comprising information associated with individual ones of the plurality of visual cues in the sequence, wherein the attention score matrix identifies significance of each of the plurality of visual cues in the visual language sentence.

4. The system of claim 1, wherein a size of a visual cue is exponentially proportional to a duration of the fixation.

5. The system of claim 1, wherein the at least one computing device is further directed to perform at least one of resizing, normalizing, and padding the plurality of visual cues as extracted.

6. The system of claim 5, wherein the padding of the plurality of visual cues as extracted comprises padding the plurality of visual cues into a predetermined length and embedding the plurality of visual cues into a plurality of matrices.

7. The system of claim 1, wherein the plurality of visual cues are organized in an ordered sequence with an arbitrary length, and the visual language sentence comprises a numerical matrix.

8. The system of claim 1, wherein the visual language understanding routine is a convolutional neural network (CNN) artificial intelligence routine or a deep-learning artificial intelligence routine.

9. The system of claim 1, wherein the manufacturing item is an additive manufacturing item.

10. The system of claim 1, wherein:
the eye tracking correlates eye movement relative to pixel coordinates of the user interface shown on the display device;
the visual language understanding routine is a convolutional neural network (CNN) artificial intelligence routine; and
the at least one computing device is further directed to impose nonlinearity on each neural network layer of the CNN using an activation function.

11. A computer-implemented method, comprising:
directing a display of a user interface on a display device, wherein the user interface comprises a manufacturing item to be classified as conforming or non-conforming;
in association with the display of the user interface, performing an eye tracking via images captured by an imaging device to programmatically detect eye movement and fixation relative to a plurality of sub-regions of the user interface associated with the manufacturing item;
identifying a plurality of eye fixations on at least one of the plurality of sub-regions from the eye tracking;
extracting a plurality of visual cues from the user interface based at least in part on the plurality of eye fixations, the plurality of visual cues being in a sequence of identification;
generating a visual language sentence based at least in part on the plurality of visual cues as extracted; and
correlating the visual language sentence of the plurality of visual cues in the sequence of identification to at least one decision using a visual language understanding routine, the at least one decision comprising a classification decision to classify the manufacturing item as conforming or non-conforming.

12. The method of claim 11, wherein:
the plurality of eye fixations are associated with a gaze duration, pixel coordinates, and an order index; and
the plurality of visual cues are extracted from the user interface based at least in part on the gaze duration, the pixel coordinates, and the order index.

13. The method of claim 11, wherein the visual language sentence of the plurality of visual cues in the sequence is correlated to at least one decision by:
generating an attention score matrix comprising information associated with individual ones of the plurality of visual cues in the sequence, wherein the attention score matrix identifies significance of each of the plurality of visual cues in the visual language sentence.

14. The method of claim 11, wherein a size of a visual cue is exponentially proportional to a duration of the fixation.

15. The method of claim 11, wherein the at least one computing device is further directed to perform at least one of resizing, normalizing, and padding the plurality of visual cues as extracted.

16. The method of claim 15, wherein the padding of the plurality of visual cues as extracted comprises padding the plurality of visual cues into a predetermined length and embedding the plurality of visual cues into a plurality of matrices.

17. The method of claim 11, wherein the plurality of visual cues are organized in an ordered sequence with an arbitrary length, and the visual language sentence comprises a numerical matrix.

18. The method of claim 11, wherein the visual language understanding routine is a convolutional neural network (CNN) artificial intelligence routine or a deep-learning artificial intelligence routine.

19. The method of claim 11, wherein the manufacturing item is an additive manufacturing item.

20. The method of claim 11, wherein:
the eye tracking correlates eye movement relative to pixel coordinates of the user interface shown on the display device;
the visual language understanding routine is a convolutional neural network (CNN) artificial intelligence routine; and
the at least one computing device is further directed to impose nonlinearity on each neural network layer of the CNN using an activation function.

* * * * *